(12) United States Patent
Buchholz et al.

(10) Patent No.: US 8,376,731 B2
(45) Date of Patent: Feb. 19, 2013

(54) METHOD FOR PRODUCING HOLLOW BODIES FROM THERMOPLASTIC MATERIAL, AND DEVICE FOR PRODUCING HOLLOW BODIES FROM THERMOPLASTIC MATERIAL

(75) Inventors: Thomas Buchholz, Bergisch Gladbach (DE); Dirk Eulitz, Bonn (DE); Harald Lorenz, Bad Neuenahr-Ahrweiler (DE); Gerd Wolter, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 13/084,755

(22) Filed: Apr. 12, 2011

(65) Prior Publication Data
US 2011/0189331 A1 Aug. 4, 2011

Related U.S. Application Data

(62) Division of application No. 12/482,669, filed on Jun. 11, 2009, now Pat. No. 8,287,796.

(30) Foreign Application Priority Data

Jun. 11, 2008 (DE) .......................... 10 2008 027 824

(51) Int. Cl.
*B29C 49/20* (2006.01)
*B29C 49/30* (2006.01)
*B29C 49/64* (2006.01)
(52) U.S. Cl. ......... 425/508; 425/503; 425/519; 425/526
(58) Field of Classification Search ............. 264/171.12, 264/531, 534, 540, 545, 516, 523, 259, 267; 425/528, 534, 508, 526, 503, 518, 519, 520, 425/538, 541
See application file for complete search history.

(56) References Cited

U.S. PATENT DOCUMENTS

| 5,534,218 A | 7/1996 | Daubenbuchel et al. |
| 6,860,398 B2 | 3/2005 | Potter et al. |

(Continued)

FOREIGN PATENT DOCUMENTS

| DE | 100 10 900 | 9/2001 |
| DE | 102 31 866 | 1/2004 |

(Continued)

OTHER PUBLICATIONS

International Search Report dated Jan. 14, 2010, received in corresponding PCT Application No. PCT/EP09/02509.

(Continued)

*Primary Examiner* — Joseph Del Sole
*Assistant Examiner* — Ryan Ochylski
(74) *Attorney, Agent, or Firm* — Grossman Tucker Perreault & Pfleger, PLLC

(57) ABSTRACT

The invention relates to a device for producing hollow bodies from thermoplastic material in which web- or strip-type preforms of plasticized plastics material are shaped in a multi-part tool which forms a mold nest, with two outer molds and a central mold which perform opening and closing movements with respect to one another. The central mold is provided with at least one device for receiving and manipulating components to be fastened in the interior of the hollow body by means of a material and/or form-fitting joint. Prior to the fastening of the components to the inner wall of the hollow body to be produced, the components are heated by means of a radiant heating device. The radiant heating device is advantageously integrated in the central mold of the tool.

7 Claims, 3 Drawing Sheets

U.S. PATENT DOCUMENTS

| | | | |
|---|---|---|---|
| 6,866,812 B2 | 3/2005 | Van Schaftingen et al. | |
| 6,893,603 B2 | 5/2005 | Rohde et al. | |
| 2007/0051730 A1* | 3/2007 | Vorenkamp et al. | 220/562 |
| 2008/0006625 A1 | 1/2008 | Borchert et al. | |
| 2008/0078761 A1 | 4/2008 | Borchert | |
| 2009/0026664 A1 | 1/2009 | Criel et al. | |
| 2009/0047375 A1 | 2/2009 | Borchert et al. | |
| 2009/0250458 A1* | 10/2009 | Criel et al. | 220/4.13 |
| 2010/0139842 A1 | 6/2010 | Criel et al. | |

FOREIGN PATENT DOCUMENTS

| | | |
|---|---|---|
| DE | 10 2006 006 469 | 8/2007 |
| DE | 10 2006 031 902 | 1/2008 |
| WO | 2004007182 | 1/2004 |
| WO | WO 2006064004 A1 * | 6/2006 |
| WO | 2007000454 | 1/2007 |
| WO | 2008/145246 | 12/2008 |

OTHER PUBLICATIONS

U.S. Office Action dated Dec. 27, 2010 issued in related U.S. Appl. No. 12/482,669.

U.S. Office Action dated Jun. 7, 2011 issued in related U.S. Appl. No. 12/482,669.

U.S. Office Action dated Nov. 9, 2011 issued in related U.S. Appl. No. 12/482,669.

PCT Translation of the International Preliminary Report on Patentability/Written Opinion mailed on Jan. 20, 2011, received in corresponding PCT Application No. PCT/EP09/02509, 12 pages.

* cited by examiner

US 8,376,731 B2

METHOD FOR PRODUCING HOLLOW BODIES FROM THERMOPLASTIC MATERIAL, AND DEVICE FOR PRODUCING HOLLOW BODIES FROM THERMOPLASTIC MATERIAL

CROSS-REFERENCE TO RELATED APPLICATIONS

This application is a divisional application of U.S. Ser. No. 12/482,669, filed Jun. 11, 2009 which claims priority to DE 10 2008 027 824.6, filed Jun. 11, 2008, the teachings of which are incorporated herein by reference.

FIELD

The invention relates to a method for producing hollow bodies from thermoplastic material in which web- or strip-type preforms of plasticised material are shaped in a multi-part tool which forms a mould nest comprising two outer moulds and a central mould which perform opening and closing movements with respect to one another, which central mould is provided with at least one device for receiving and manipulating components to be fastened in the interior of the hollow body by a material and/or form-fitting joint, the preforms first being applied and shaped by means of differential pressure against a contour of the outer moulds which delimits a part of the mould nest in the interior of the tool, components to be fixed in the hollow body being fastened to the wall of the intermediate products oriented towards the mould nest in a following process step and the intermediate products which form the respective parts of the hollow body then being connected to form a finished product.

The invention further relates to a device for producing hollow bodies from thermoplastic material, in particular for carrying out the above-described method.

BACKGROUND

In extrusion blow moulding of plastic products, moulding tools comprising two mould-halves which are configured complementary to one another and jointly delimit a mould nest are usually employed. A thermoplastic extrudate, usually in the form of a tube, is placed between the open halves of the tool. The tool is closed around the preform, which is applied inside the tool against the interior wall of the cavity formed by the tool, so that the finished article has an outer form corresponding to the inner contour of the moulding tool. The shaping of the preform inside the cavity of the tool is effected either by expanding the preform by means of gas pressure or by applying the preform against the inner wall of the tool by means of negative pressure, which is exerted via channels in the inner wall of the mould.

If components are to be placed inside a product to be produced in this manner, the part concerned is placed by means of a holder between the open mould parts in such a manner that the tube-shaped extrudate surrounds the component around which blow moulding is to take place. The mould parts are then closed around the tube and the component received therein. Depending on the type of fastening of the component inside the container to be produced, further slides, component holders, dies or the like are required.

In another known method for extrusion blow moulding of hollow bodies, web- or strip-type extrudates are continuously extruded into an open tool from above, or removed from an extruder by means of a manipulator while still in a plastic state, and introduced between the open parts of the tool. Such a method has advantages with regard to introducing built-in parts into the container to be produced.

Such a method is known, for example, from DE 10 2006 031 902 (filed at the German Patent and Trade Mark Office on Jul. 7, 2006). Reference is made here to the contents of this disclosure in their entirety. In the method known from DE 10 2006 031 902 web- or strip-type preforms of plasticised material are shaped in a multi-part tool, which forms a mould nest, through expansion and application of the preforms against the inner contour of the mould nest. Two mutually complementary intermediate products in the form of shells are formed first. Built-in parts are then fastened to the inner faces of the shells, which are oriented towards one another in the installed position. The shells are then joined together and welded to one another by their peripheral, flange-like edges to form the finished hollow body.

The attachment of built-in parts to the inner wall of an intermediate product which has been obtained using a method described above is also known, for example, from US 2008/006625 A1, filed at the USPTO on Mar. 7, 2007, to the contents of which reference is made here in their entirety.

Finally, such a method is known, for example, from DE 10 2006 027 256 A1, filed at the German Patent and Trade Mark Office on Sep. 6, 2006, to the contents of which reference is likewise made here in their entirety. This document relates to a moulding tool for producing extrusion blow moulded products in the above-described form. This moulding tool comprises two outer moulds and a central mould. The outer moulds and the central mould are displaceable away from and towards one another in the sense of an opening and closing movement of the tool. The central mould is provided with component holders as the manipulation device, which component holders can be moved into and out of the tool plane defined by the central mould. The component holders are in turn arranged on a carrier which is also displaceable with respect to the central mould.

All the above-mentioned methods are characterised in particular by the advantage that the introduction of built-in components into the container to be produced is comparatively simple. Other manipulations on the inner wall of the container to be produced are also readily conceivable, and are comparatively simple to implement.

However, in practical application the fastening of built-in parts inside the hollow body has proved difficult. The thermoplastic material for producing the containers usually consists of an extrudate with one or more barrier layers, adhesive agent layers and outer and inner layers of polyethylene. Fastening of components to the wall of the intermediate product is possible either in a form-fitting manner by locking, or by a type of riveting as known, for example, from DE 10 2006 006 469, or by welding. In the case of riveting, which is preferably carried out without additional riveting dies or the like, the warm-plastic material of the intermediate product is pressed through arcuate openings of the built-in part, where the warm-plastic material flows behind the openings in the manner of a rivet head and forms a form-fitting connection upon cooling. This has the advantage that the component does not need to be made of a compatible plastics material in terms of weldability. In the case of welding, by contrast, the plastics materials used for both the built-in component and the intermediate product must be compatible with one another. In either case, with this type of introduction of built-in components, contact between the built-in component and the still warm-plastic or hot-plastic wall of the intermediate product is problematic. Upon a first contact, sudden zonal cooling of the intermediate product takes place, which in the case of production of a welded connection is detrimental to the quality of the welded connection. In addition, through differential cooling of the wall of the intermediate product sunken areas can be produced at different points on the finished product, which are also undesirable.

SUMMARY

It is therefore the object of the invention to improve a method of the above-described type in this regard. It is a further object of the invention to provide an improved device for implementing such a method.

The object is achieved, firstly, by a method for producing hollow bodies from thermoplastic material in which web- or strip-type preforms of plasticised material are shaped in a multi-part tool which forms a mould nest comprising two outer moulds and a central mould which perform opening and closing movements with respect to one another, which central mould is provided with at least one device for receiving and manipulating components to be fastened in the interior of the hollow body by a material and/or form-fitting joint, the preforms first being applied and shaped by means of differential pressure against a contour of the outer moulds which delimits a part of the mould nest in the interior of the tool, components to be fixed in the hollow body being fastened to the wall of the intermediate product oriented towards the mould nest in a following process step and the intermediate products which form the respective parts of the hollow body then being connected to form a finished product, the method being characterised in that at least one of the components to be fastened in the hollow body is preheated with at least one heating device and is fixed to the wall of the intermediate product in the preheated state.

The invention can be summarised by stating that heating of the components to be fastened in the hollow body to be produced is integrated in the production process, specifically with the use of an integrated heating device, so that it is ensured that the container wall does not cool below the optimum welding temperature upon contact with the component to be welded. Such impermissible cooling may in some cases occur if the still-cold component comes into contact with the hot-plastic or warm-plastic container wall. In this case a permanently durable material joint between the component and the container wall would not be achieved. Through the inventive heating of the component concerned it is ensured that the parts to be connected have an optimum temperature for welding, so that impermissible cooling below the temperature required for welding cannot take place. Heating of the components can be effected in such a manner that welding of the relevant joint surfaces of the components to the container wall can be achieved over their full area.

A variant of the method according to the invention is characterised by the use of a heating device integrated in the tool, by means of which heating device automatic heating of the component to be fastened takes place.

The component to be fastened may be fastened to the wall of the intermediate product by a material and/or a form-fitting joint. In the case of an exclusively form-fitting connection of the component to the container wall, heating of the component, as already described in the introduction, is also advantageous.

The heating is advantageously effected by means of contact heat transfer. For this purpose a resistance heating element which is brought into contact with the joint surface of the component concerned may, for example, be provided. Alternatively, the heating may be effected by means of radiant heat, for example by means of IR radiation.

A preferred variant of the method according to the invention provides for production a fuel container for motor vehicles in which at least one venting device is provided as the component to be introduced into the fuel container, with at least one connection point in the container and with at least one opening in the container wall.

As a venting device, a tank-filling venting device with at least one tank-filling vent valve, a tank-filling vent conduit and a connection fitting may, for example, be provided.

It is within the scope of the invention that all other built-in components to be provided in a fuel container can be fastened in the manner according to the invention.

A variant of the method according to the invention is characterised in that the fastening of the venting device is effected by means of the manipulation device in two spatial axes oriented at an angle to one another, one component being fixed to the container wall by a material and/or form-fitting joint by means of a manipulation movement and at least one further component being fixed to the container wall at an angle to the first-mentioned component by means of at least one further manipulation movement. For example, a connection fitting which is pre-heated by means of a heating device and is then connected to the container wall while passing through it may be provided as a second component.

The object of the invention is further achieved by a device for producing hollow bodies from thermoplastic material, in particular for carrying out the above-described method, comprising at least two outer moulds forming a mould nest and at least one central mould which can be placed between the outer moulds, the outer moulds being movable towards and away from one another in the sense of an opening and closing movement and the central mould being displaceable transversely to the opening and closing movement of the outer moulds, and comprising means for receiving and manipulating components to be arranged in the hollow body, the device being characterised in that at least one heating device integrated in the central mould is provided.

The heating device may advantageously be configured as a contact heating device. For this purpose, resistance heating elements which effect heating of the part concerned by means of contact heat transfer may, for example, be provided on or at the manipulation device.

BRIEF DESCRIPTION OF THE DRAWINGS

The invention is explained below with reference to an exemplary embodiment represented in the drawings, in which.

DETAILED DESCRIPTION

The method according to the invention will be explained first with reference to FIGS. 1 and 2. This method comprises the extruding of two web- or sheet-type preforms 1 of thermoplastic material from one or more extruders (not shown) arranged above a tool 2. The preforms may have been obtained by cutting open a tube-shaped preform, or alternatively may have been extruded from suitably configured nozzles (wide-slot nozzles). The preforms 1 consist substantially of a six-layer coextrudate of polyethylene, recyclate (regrind/scrap), adhesive agent layers and EVOH barrier layers for hydrocarbons. In the exemplary embodiment described, the product to be produced according to the inventive method is a fuel container made of thermoplastic material.

The preforms 1 may have been extruded directly above the tool 2 in the direction of gravity; alternatively, they may have been removed from an extrusion head by means of a manipulation device and transferred into the tool 2. In FIGS. 1 and 2 the tool 2 is shown in a partially sectional top view. It comprises two outer moulds 3a, 3b and a central mould 3c in the form of an intermediate frame. The outer moulds 3a, 3b can be moved towards and away from one another in the sense of an opening and closing movement. The central mould 3c can be moved transversely thereto. The possible degrees of freedom of movement of the outer moulds 3a, 3b and of the central mould 3c are explained below with reference to the coordinate system marked in FIG. 1. The opening and closing movement of the outer moulds takes place in the x-axis whereas the travel movement of the central mould 3c takes place in the z-axis. The kinematics of the tool 2 in the method described herein are known in principle from the prior art. Reference is made in this regard to the prior art mentioned in the introduction.

Figure 3:
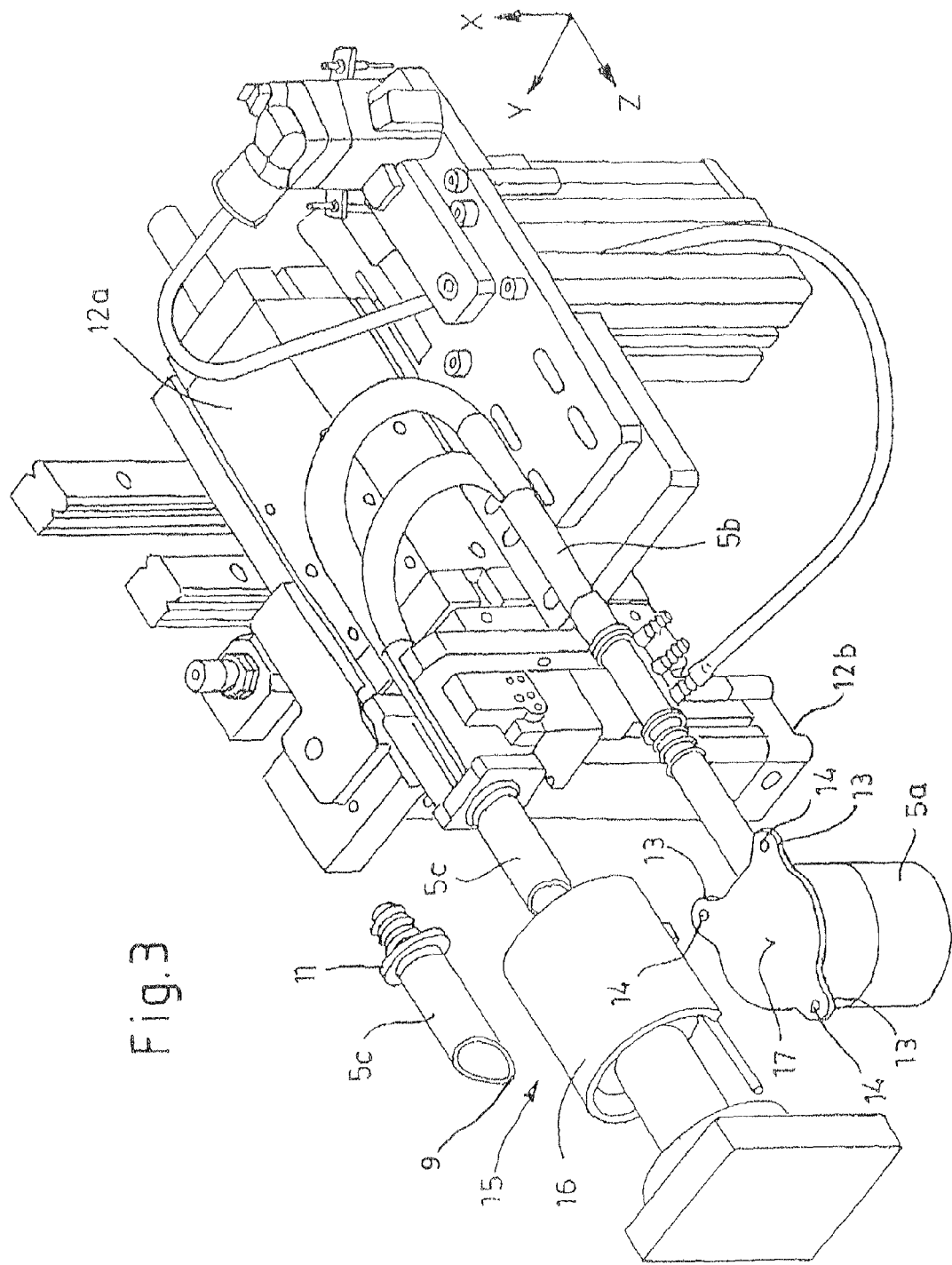
FIG. 3 is an enlarged schematic view of a manipulation device according to the invention.

Arranged inside the central mould 3c is a pneumatically displaceable component carrier 4 which is displaceable in the x- and z-axes by means of pneumatic cylinders; in FIG. 3 the component carrier 4 receives a tank-filling venting device 5 of the subsequent fuel container. Although the component carriers are displaceable by means of pneumatic cylinders in the exemplary embodiment described, electromechanically actuated manipulation elements may be provided instead of such pneumatic cylinders. Alternatively, the use of hydraulically actuated manipulation means is also possible. According to the invention, the component carrier 4 is configured as a manipulation device for the components to be placed in the fuel container, in the present case the tank-filling venting device 5. The tank-filling venting device 5 is mentioned here as representing all other components to be arranged in a fuel container.

The tank-filling venting device 5 comprises a tank-filling vent valve 5a as a fuel level limiting valve, a vent line 5b and a connection fitting 5c, which are connected to one another. For reasons of clarity, the tank-filling venting device 5 is shown in highly simplified form; in reality, a fuel container for motor vehicles has various vent points which are interconnected by vent lines. The vent points are in the form either of fuel level limiting valves with roll-over function or as simple operational vent valves which are connected to one another via one or more trains of conduits.

In the exemplary embodiment illustrated, parts of the tank-filling venting device 5 are displaceable in the spatial axes by means of first and second pneumatic cylinders 12a, 12b.

Figure 1:
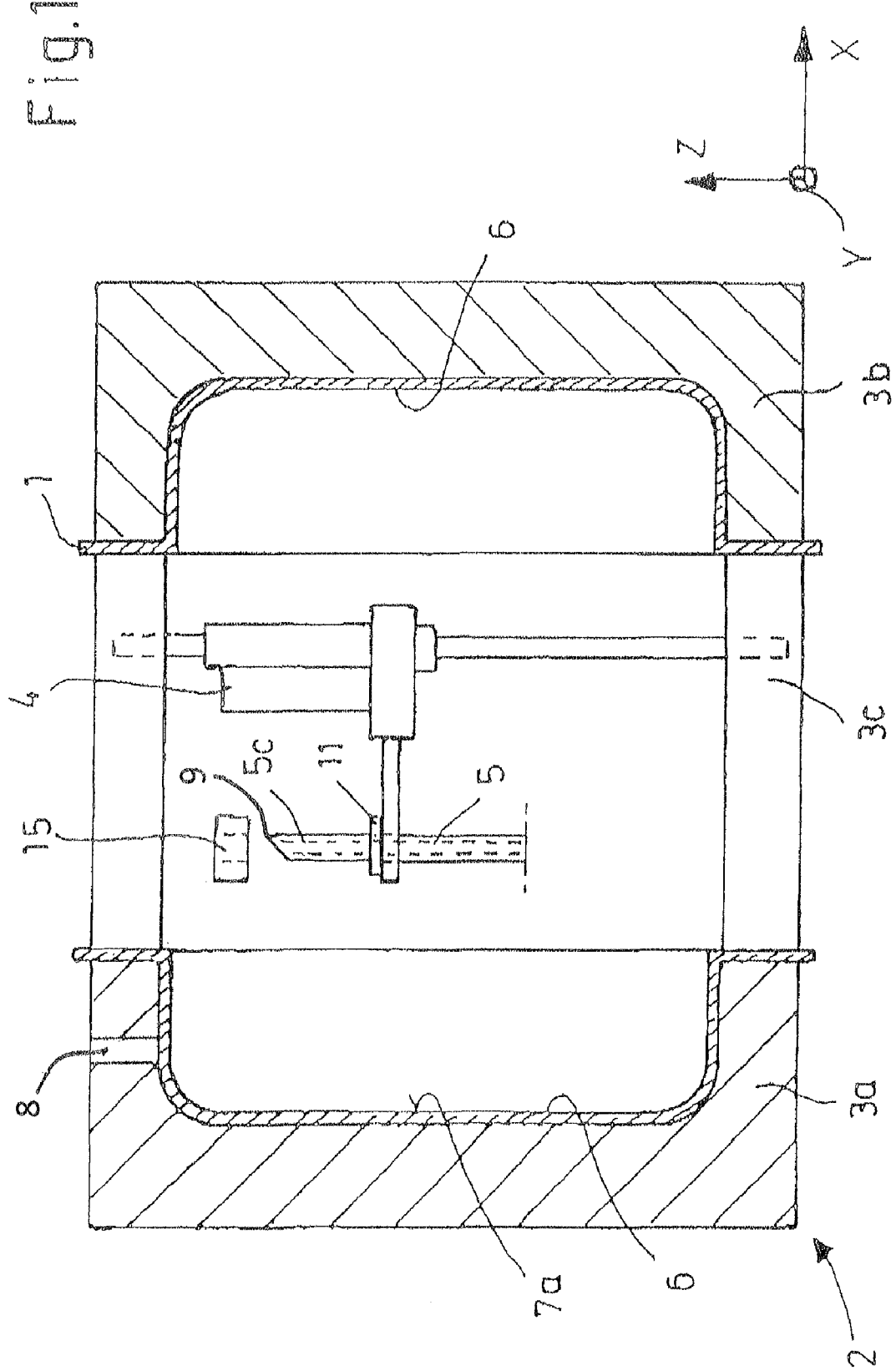
FIG. 1 is a partially sectional schematic top view of a device according to the invention.
Figure 2:
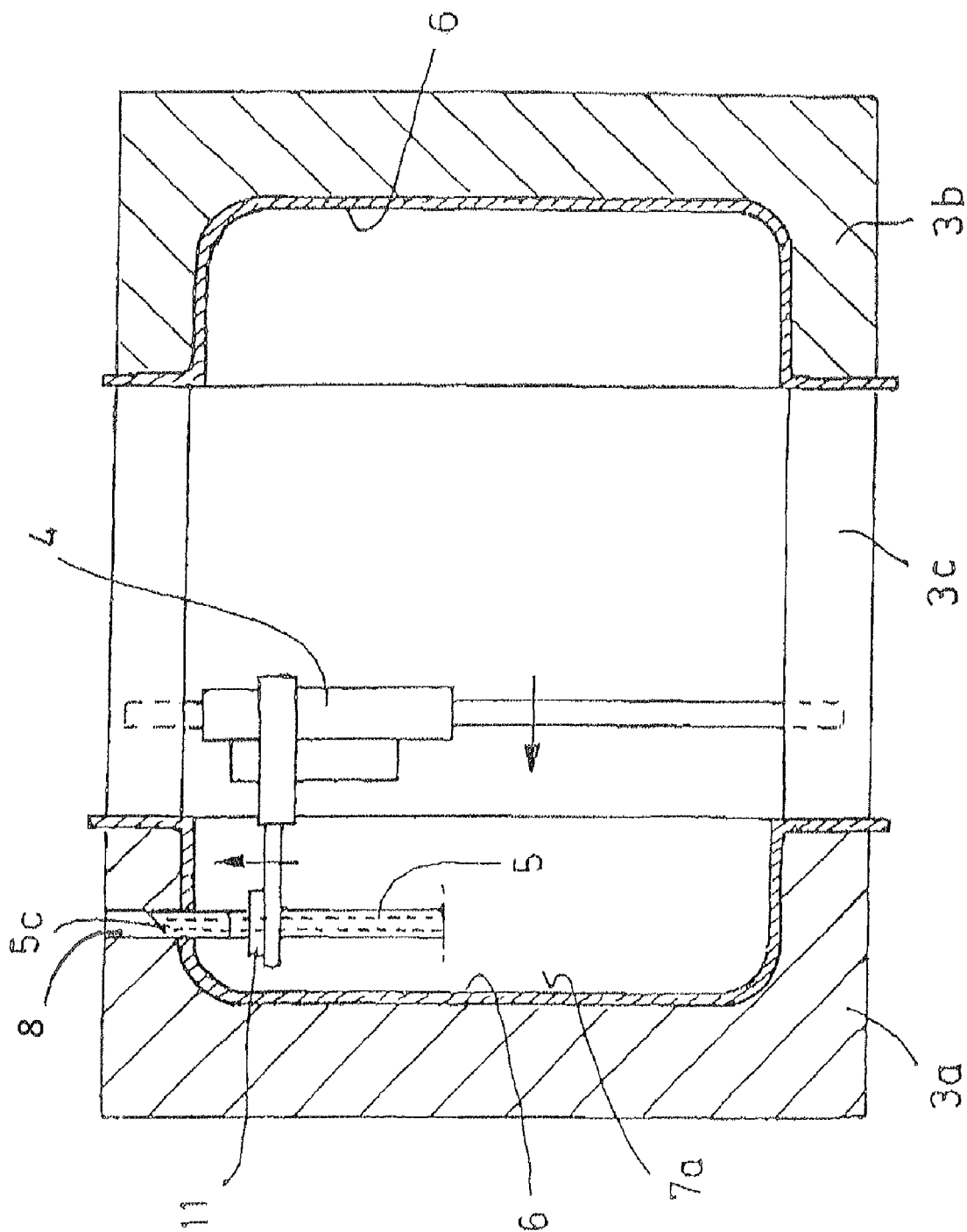
FIG. 2 is a view corresponding to FIG. 1, FIGS. 1 and 2 illustrating the method according to the invention.

FIG. 1 shows the time in the production process of the fuel container at which the tool has just been closed. The outer moulds 3a, 3b define the mould nest determining the contour of the container.

In a first process step the outer moulds 3a, 3b are moved or closed in the direction of the x-axis against the central mould 3c. The still warm-plastic extrudate, or the still warm-plastic preforms 1, are expanded by exertion of differential pressure inside the mould nest defined by the outer moulds 3a, 3b inside the cavity formed by the outer moulds 3a, 3b, are shaped and applied to the mould wall so that they adopt the position marked in FIG. 1. In this way two shell-shaped intermediate products 6 are obtained.

The tank-filling venting device 5 is then placed against an inner wall 7a of an intermediate product 6 by means of the component carrier 4. As this happens, the tank-filling vent valve 5a is first pressed against the still warm-plastic inner wall 7a. For this purpose the tank-filling vent valve 5a is provided on its periphery with fastening feet 13 which are each provided with openings 14. As the tank-filling vent valve 5a is fitted against the still warm-plastic inner wall 7a of the intermediate product 6, the thermoplastic extrudate flows through and behind the openings 14 of the fastening feet 13 of the tank-filling vent valve 5a, so that a form-fitting joint, and optionally also a material joint, between the tank-filling vent valve 5a and the inner wall 7a is obtained.

The component carrier 4 shown enlarged in FIG. 3 comprises, as mentioned above, at least a first and a second pneumatic cylinder 12a, 12b which can perform movements in respective spatial axes extending perpendicularly to one another, together with the holding devices attached thereto.

The component carrier 4 according to the invention is further provided with a heating device 15 which includes a cylindrical heat shield 16. In the exemplary embodiment described, the heating device 15 is in the form of a contact heating ring which, as a resistance-heated annular element, is brought into abutment with a peripheral collar 11 of the connection fitting 5c in such a manner that the collar 11 is heated through contact heat transfer.

With a first manipulation movement, induced by actuation of the pneumatic cylinder 12a, in the direction of the z-axis marked in FIG. 3, the connection fitting 5c is moved into the heating device 15. The connection fitting 5c is then heated with the heating device 15. Through a further manipulation movement the connection fitting 5c is moved out of engagement with the heating device 15. The whole tank-filling venting device 5 or the whole arrangement is then moved by actuation of the pneumatic cylinder 12b in the direction of the x-axis, the tank-filling vent valve 5a being connected to the inner wall 7a of the intermediate product 6 via its contact surface 17. Depending on the material used for the tank-filling vent valve 5a, the latter may be welded over its full area to the inner wall 7a of the intermediate product 6. Welding does not take place, for example, if the tank-filling vent valve 5a consists, as is usual, of POM (polyoxymethylene). Instead, a form-fitting connection is effected in that the warm-plastic material of the inner wall 7a of the intermediate product 6 flows through and behind the openings 14 of the fastening feet 13.

The fastening of the vent valve 5a is followed directly by a further manipulation movement in the direction of the z-axis, the wall of the intermediate product 6 being penetrated by means of the preheated connection fitting 5c.

In the method according to the invention it is provided that the preheating of the connection fitting 5c and the penetration of the wall of the intermediate product 6 by the connection fitting 5c take place in immediate temporal succession, so that no significant cooling of the connection fitting 5c can occur.

For this purpose a receptacle 8 for the penetration tip 9 of the connection fitting 5c is provided in the outer mould 3a. A material joint between the connection fitting 5c and the intermediate product 6 is achieved by welding of the peripheral collar 11 of the connection fitting 5c to the inner wall 7a of the intermediate product 6.

The invention should be understood in such a manner that the sequence of manipulation movements which are induced via the pneumatic cylinders 12a, 12b, and optionally via further pneumatic cylinders, is not critical for the invention.

Likewise, the method has been described only in relation to heating of the connection fitting 5c. Self-evidently, the method should be understood in such a manner that it is advantageous and desirable to preheat the vent valve 6 with a corresponding heating device.

Moreover, the invention has been described in a simplified manner using the example of a tank-filling venting device; in reality, the introduction of complex conduit and functional-component structures is envisaged. Furthermore, the method has been described hereinbefore only in relation to two manipulation movements disposed perpendicularly to one another; it is self-evident that the manipulation movements may be performed at any desired different angles and in any desired sequence, depending on the construction and arrangement of the component carriers and on the complexity of the container to be produced.

LIST OF REFERENCES

1 Preforms
2 Tool
3*a*, 3*b* Outer moulds
3*c* Central mould
4 Component carrier
5 Tank-filling venting device
5*a* Tank-filling vent valve
5*b* Vent line
5*c* Connection fitting
6 Intermediate products
7*a* Inner wall
8 Receptacle
9 Penetration tip
11 Collar
12*a*, 12*b* Pneumatic cylinders
13 Fastening feet
14 Opening
15 Heating device
16 Heat shield
17 Contact surface

What is claimed is:

1. Device for producing hollow bodies from thermoplastic material comprising:
   at least two outer moulds forming a mould nest;
   at least one central mould which can be placed between the outer moulds, wherein the outer moulds are movable towards and away from one another in the sense of an opening and closing movement;
   wherein the central mould is displaceable transversely to the opening and closing movement of the outer moulds; and
   including a component carrier for receiving and manipulating one or more components to be arranged in the hollow body, the hollow body having an inner wall;
   wherein the component carrier includes at least one heating device for heating said one or more components; and
   wherein the component carrier comprises a manipulation device which is displaceable in two spatial axes orientated at an angle to one another when the central mould is in place between the outer moulds and the outer moulds are against the central mold.

2. Device according to claim 1, wherein a resistance heating element is provided as said at least one heating device.

3. Device according to claim 1, wherein a contact heating ring is provided as said at least one heating device.

4. Device according to claim 1, wherein said component carrier is displaceable by one of pneumatic, hydraulic or electromechanical actuation.

5. Device according to claim 1, wherein said one or more components includes a tank-filling device.

6. Device according to claim 5, wherein said tank-filling device comprises a tank-filling vent valve as a fuel level limiting valve, a vent line and a connection fitting.

7. Device according to claim 1, wherein said one or more components are fastened to the interior of said hollow body by a material and/or form-fitting joint.

* * * * *